United States Patent [19]
Keller

[11] 4,294,376
[45] Oct. 13, 1981

[54] FUEL TANK CAP
[76] Inventor: Russell D. Keller, 1750 SE. Risley, Milwaukie, Oreg. 97222
[21] Appl. No.: 108,448
[22] Filed: Jan. 3, 1980
[51] Int. Cl.³ .......................................... B65D 45/00
[52] U.S. Cl. .................................. 220/318; 220/323; 220/DIG. 33; 220/231
[58] Field of Search ....... 220/315, 318, 323, DIG. 33, 220/233, 231, 234, 237, 238

[56] References Cited
U.S. PATENT DOCUMENTS
2,772,809 12/1956 Ross ................................. 220/323 X
3,126,728 3/1964 Nehls ............................... 220/315 X
3,731,837 5/1973 Platts et al. ........................ 220/315

Primary Examiner—George T. Hall
Attorney, Agent, or Firm—Klarquist, Sparkman, Campbell, Leigh, Whinston & Dellett

[57] ABSTRACT

A fuel tank cap includes a ball cage centrally depending from a fuel tank cap body, said ball cage having a plurality of tank neck engaging balls located in a plurality of side openings through which the balls are selectively urged. A plunger cone within the ball cage is slidable between a first position where it urges the aforementioned balls outwardly for locking the cap to the fuel tank neck, and a second position allowing inward movement of the balls within the ball cage and removal of the cap from the fuel tank neck.

8 Claims, 5 Drawing Figures

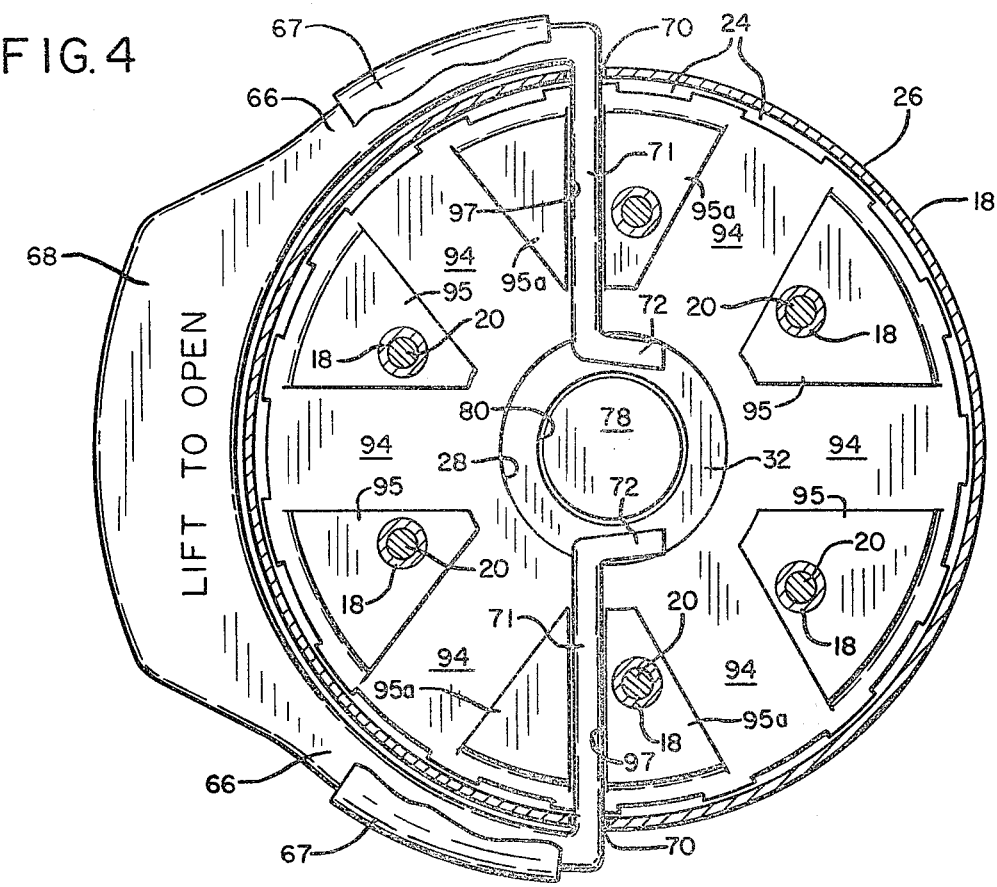
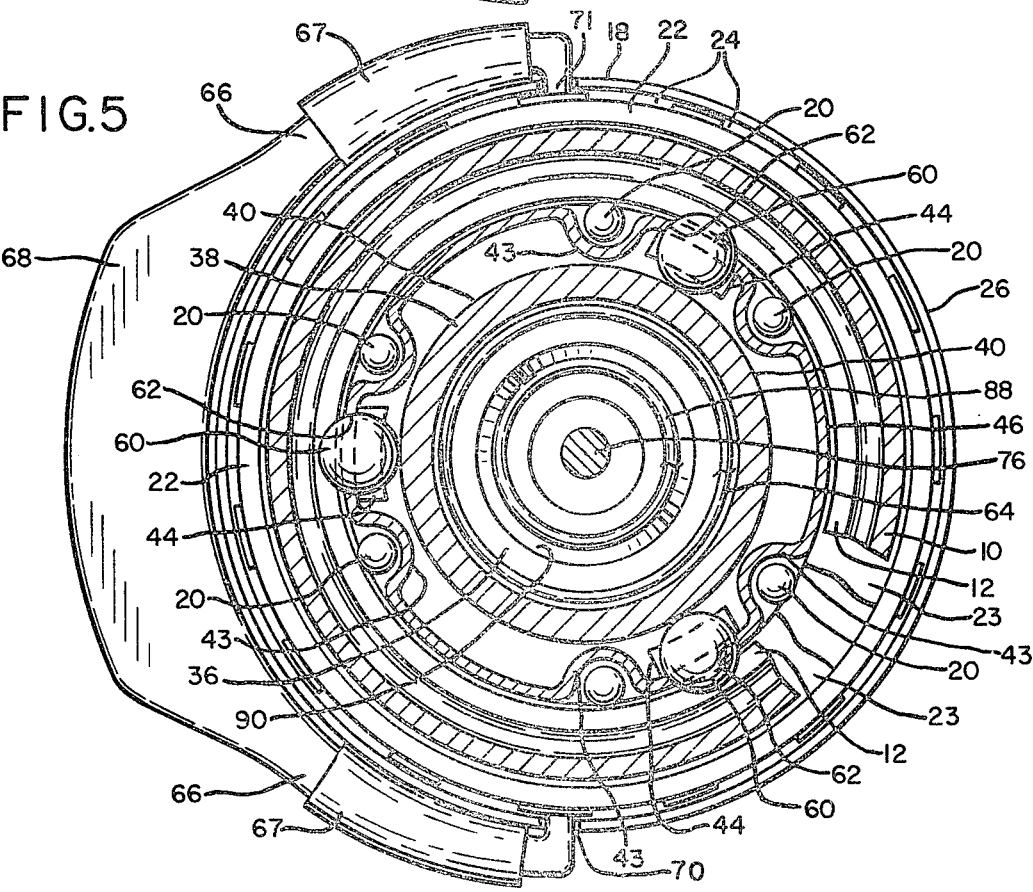

FUEL TANK CAP

BACKGROUND OF THE INVENTION

This invention relates to a fuel tank cap and particularly to such a cap which can be easily and safely attached to and disengaged from the neck of a fuel tank.

The usual fuel tank cap for a motor vehicle or the like is of the screw-on variety which must be threadably engaged and disengaged for access to the fuel tank. This type of cap may become frozen in position, particularly if tightly applied, and may require the use of a tool for removal. On the other hand, if the fuel tank cap is not secured properly it may become sufficiently loosened as a result of vibration to allow dangerous spillage of fuel. It can also be difficult to apply a threaded cap properly, especially under adverse conditions, since the threads should, of course, be carefully started with a correct cap orientation wherein the threads mate. However, if the threads are worn, or partially or fully stripped, a secure closure is not likely.

SUMMARY OF THE INVENTION

A fuel tank cap according to the present invention includes a cap body adapted to form a closure on the outer end of a fuel tank neck, and a housing member depending from underneath the cap body provided with movable means for selectively engaging the underside of an inner lip of the fuel tank neck. The movable means provide a wedging action for securing the cap body downwardly on the fuel tank neck, and advantageously comprise a plurality of spherical balls which are urged outwardly from the aforementioned housing member. An actuating member for operating the movable means preferably comprises a ramp member suitably taking the form of a plunger cone having a first axial position wherein the conical periphery of the plunger cone holds the balls outwardly in wedging, securing relation to the fuel tank neck, and a second position wherein the periphery of the plunger cone in contact with the movable means or balls has a diameter for receiving the balls inwardly within the housing member for releasing engagement with the fuel tank neck. A manually operable control on the upper side of the cap body suitably comprises a handle for moving the actuating member or plunger cone between its first and second positions. The cap also preferably includes a pressure release valve.

The fuel tank cap is easily removed and easily installed, while providing a secure closure to the fuel tank. No problem can arise relating to the loosening of the cap as a result of its not being in completely threaded engagement with the fuel tank neck. Furthermore, the cap is applicable to the fuel tank neck in substantially any position and essentially snaps onto the fuel tank neck in one motion.

It is accordingly an object of the present invention to provide an improved fuel tank cap which doesn't rely on a threaded connection with the fuel tank neck.

It is another object of the present invention to provide an improved fuel tank cap which is easily removed and easily installed on the upper end of a fuel tank neck, but yet provides a secure closure therefor.

It is a further object of the present invention to provide an improved fuel tank cap which is easy to operate and which can be installed in any position of angular orientation.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 4 is a horizontal cross section of said fuel tank cap as taken at 4—4 in FIG. 2; and FIG. 5 is a horizontal cross section of said fuel tank cap as taken at 5—5 in FIG. 3.

DETAILED DESCRIPTION

Figure 1:
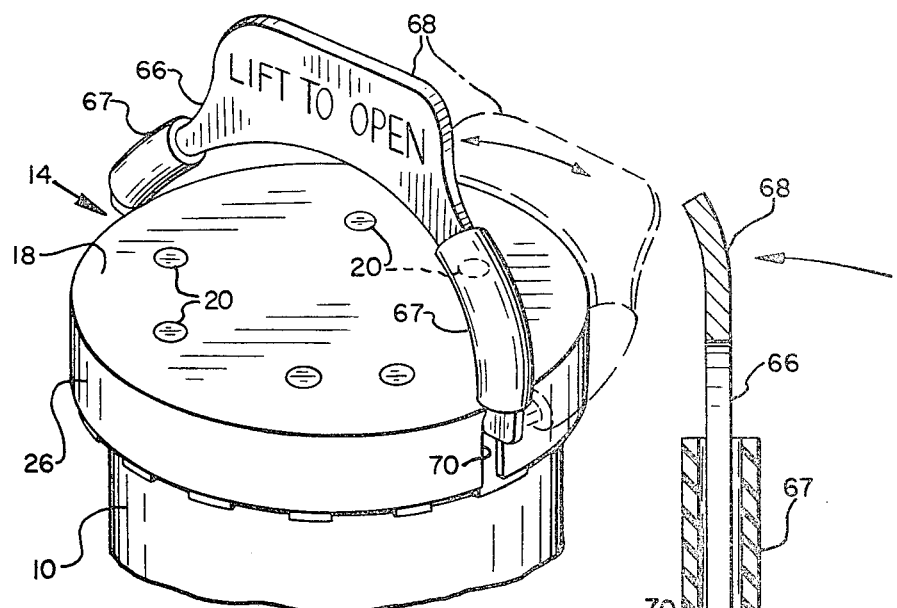
FIG. 1 is a perspective view of the fuel tank cap according to the present invention.

Referring to the drawings, a fuel tank cap according to the present invention is adapted to fit the neck 10 of a fuel tank, such neck including an inturned lip 12 forming a pocket at the top of the fuel tank neck. The fuel tank cap 14 comprises a cap body 16 which is generally disk-shaped, being provided with a cover 18 secured to the cap body by a plurality of rivets 20. The cap body 16 has an outer, downwardly extending axial flange 22 formed with exterior ribs which define channels 24 therebetween to provide an air passage, covered by the exterior rim or skirt 26 of cap cover 18. Just inside the outer axial flange 22, the cap body is provided with a gasket 23 adapted for resting on and being compressed against the inwardly turned outer end of the fuel tank neck, to provide sealing while supporting the remainder of the cap body in closing relation to the fuel tank neck.

Figure 3:
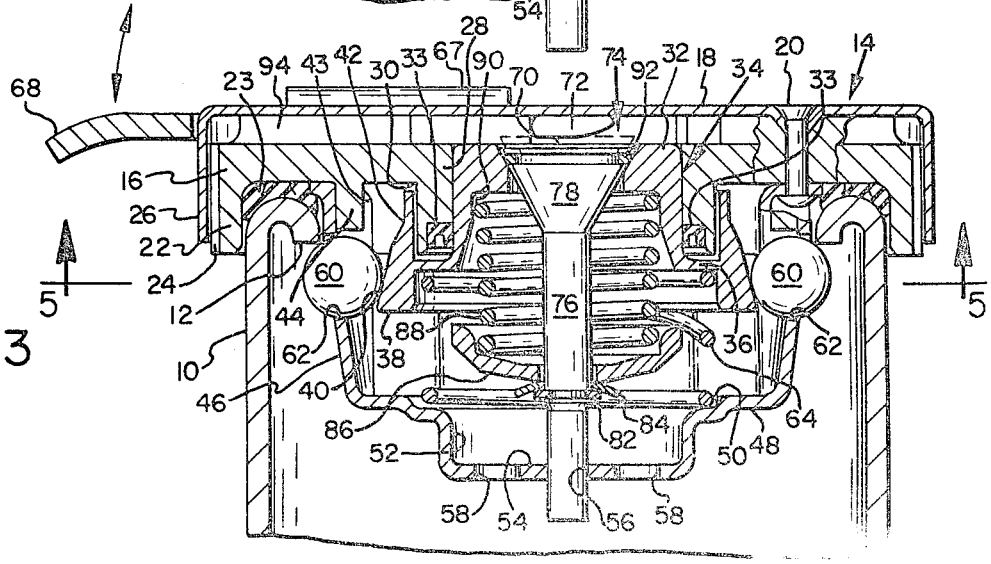
FIG. 3 is a vertical cross section through said fuel tank cap showing the same in locked relation on the top of a fuel tank neck.

A central bore 28, defined within a central axial flange 30 of the cap body, slidably receives the cylindrical hub 32 of plunger cone 34. A seal 33 is located on the lower inside of central axial flange 30 and bears against hub 32 of plunger cone 34. Said plunger cone further includes a radial web 36 extending outwardly under central axial flange 30 and terminating in a cylindrical sleeve 38 provided with a tapered and generally conical outer surface 40 defining a ball ramp. The upper portion of sleeve 38 is disposed around central axial flange 30 when the fuel tank cap is in its closed position on the fuel tank neck as illustrated in FIG. 3. The upper part of the sleeve 38 also includes a circumferential ball receiving indentation 42, the function of which will be hereinafter more fully described.

Extending downwardly from the cap body are plural intermediate abutments 44 located between outer flange 22 and central flange 30, these abutments receiving therearound a depending housing member or ball cage 46 which is cup-shaped. It is noted the ball cage is secured to the cap body by the rivets 20 which extend through top edges of side flutes 43 in ball cage 46. The cage 46 at its upper end between the flutes has an outer diameter just less than the inside diameter of lip 12 for reception within this lip. The side wall of cage 46 tapers slightly inwardly toward the bottom of the cage terminating in a lower shelf 48 provided with a central spring receiving groove 50. Inside the groove 50, the ball cage extends further downwardly defining a well portion 52 having a bottom wall 54 provided with a central stem receiving aperture 56 and a plurality of vent apertures 58 disposed therearound. Movable means comprising a plurality of spherical metal balls 60 are supported within the ball cage and extend outwardly through circular side openings 62 in the tapered sidewall of the ball cage between flutes 43, the centers of the openings being just under lip 12 in the adjacent fuel tank neck when the fuel tank cap is in place. The balls have a diameter slightly larger than the openings such that the balls will not pass entirely therethrough, but may extend outwardly by a sufficient distance to engage the underside of lip 12. Three balls are used.

Figure 2:
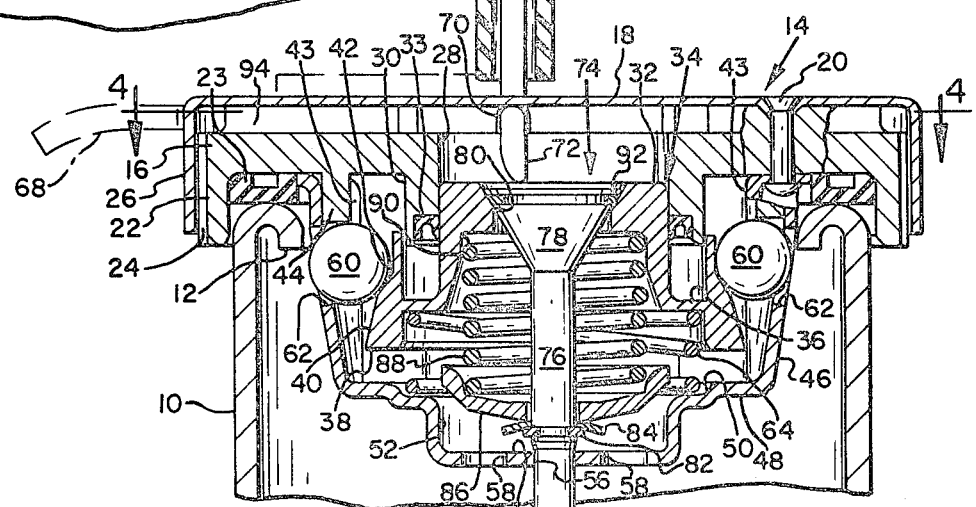
FIG. 2 is a vertical cross section through said fuel tank cap showing the same in unlocked relation on the top of a fuel tank neck.

The metal balls 60 are inwardly supported against the conical or ramp-defining outer surface 40 of plunger cone sleeve 38, the latter providing an actuating member for the metal balls. For the upper position of the plunger cone as illustrated in FIG. 3, the periphery of the plunger cone sleeve in contact with te balls has a large enough diameter for holding the balls outwardly through openings 62 in locking relation under the lip 12 of the fuel tank neck. The plunger cone 34 is urged toward this upper position by a cap spring 64 disposed between groove 50 and the underside of radial web 36 of the plunger cone. For a lower position of the plunger cone 34 as illustrated in FIG. 2, the balls 60 can fail inward against a smaller diameter portion of the plunger cone sleeve. In particular, the balls are received in the circumferential indentation 42. The upward movement of the balls is limited by abutments 44.

The balls thus selectively engage the underside of the inner lip of the fuel tank neck in a locking position as illustrated in FIG. 3, and are received farther within the ball cage 46 for clearing the lip of the neck and unlocking the cap as illustrated in FIG. 2. For moving the plunger cone 34 between its upper and lower positions and accordingly moving the balls, the fuel tank cap is provided with a manually operable control element or control handle 66 accessible from the top exterior of the fuel tank cap. The control handle is semi-circular shaped having a central lift tab 68 for convenient manual operation. The sides of the handle 66 are covered by bumpers 67 formed of plastic or the like. The handle bridges the top of the fuel tank cap between edge openings 70 in the skirt 26, and when folded down, the operating tab 68 clears the cover. Between openings 70, arms 71 integral with the handle extend inside the cover across the fuel tank cap via channels 97 in top ribs 95a of the cap body and terminate in depressor tabs 72 which bear against the top hub portion 32 of the plunger cone 34 such that when the handle 66 is upraised as illustrated in FIGS. 1 and 2, the plunger cone is depressed against the bias of spring 64 permitting the balls 60 to fall inwardly.

The fuel tank cap is attached on the end of the fuel tank neck with the handle in the upraised position and the plunger cone thus depressed. With the fuel tank cap in place, the handle 66 is then depressed to the position illustrated in FIG. 3 whereby the spring 64 raises the plunger cone and forces the balls 60 outwardly under lip 12 for locking the cap. For removing the cap the procedure is, of course, reversed, with the handle 66 being upraised such that the balls can clear the lip 12 as the cap is removed upwardly.

The fuel tank cap is further provided with a pressure relief valve generally indicated at 74 comprising a stem 76 which extends in a direction axial to the cap body and the ball cage, with the lower end thereof being slidably received in lower aperture 56 of the ball cage. The upper end of the stem carries a conical head 78 normally seating downwardly toward a mating seat 80 on the upper side of plunger cone 34. An O-ring seal 92 is provided toward the top of the conical head. The lower end of stem 76 is grooved to receive a snap ring 82 above which is positioned a downwardly tapered washer 84 supporting thereabove a cup washer 86. A stem spring 88 is disposed between cup washer 86 and the top portion of hub 32 of the plunger cone, with the spring 88 being received within a substantially mating bore 90 of the plunger cone. Bore 90 extends part way up into hub 32, having a lower opening which is tapered outwardly toward radial web 36. The tension of the spring is such that when the internal pressure in the tank reaches approximately 25 p.s.i., the resistance of the stem spring is overcome, allowing the stem to rise and vent the tank. Passages 94 are located on the underside of cover 18 between top ribs 95 of the cap body leading to channels 24 at the exterior of the cap body. On the underside of the relief valve, venting is completed via apertures 58.

It will be seen the fuel tank cap according to the present invention is easily and quickly removable without being subject to freezing in place, and can be easily and quickly installed on the top of a fuel tank neck in any angular position of orientation. The fuel tank cap essentially snaps on and can be applied or removed in substantially one motion. However, when applied, the cap is securely joined to the top of the fuel tank neck, with the balls 60 producing a wedging action under the fuel tank neck lip for holding the cap in downward sealing relation to the fuel tank neck. Pressure exerted in the direction of removal causes the balls to be forced more tightly under lip 12 because of their wedging action and because the plunger cone forces the balls outwardly. Moreover, no problems arising from failure to thread the cap properly can occur with the cap according to the present invention, nor will extensive use injure or strip any threads.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:
1. A fuel tank cap comprising:
   a cap body adapted to form a closure on the outer end of a fuel tank neck,
   a housing member depending from underneath said cap body and provided with movable means comprising a plurality of balls for selectively engaging the underside of an inner lip of the fuel tank neck when said cap body is positioned on said fuel tank neck,
   an actuating member for operating said movable means for moving the same between first and second positions into and out of engagement with the inner lip of the fuel tank neck,
   and a manually operable control element on the outer side of said cap body for causing said actuating member to operate said movable means between said first and second positions.

2. The fuel tank cap according to claim 1 wherein said actuating member comprises a ramp movable by said control element between a first position holding said balls in a first position in engagement with said inner lip of said fuel tank neck, and a second position supporting said balls in a second position for providing sliding removal of said fuel tank cap.

3. The fuel tank cap according to claim 2 wherein said manually operable control element comprises a handle tiltable between a downward position and an upward position, said handle having a tab for engaging said actuating member and moving the same to said second position when said handle is in said upward position.

4. A fuel tank cap comprising:
   a cap body adapted to form a closure on the outer end of a fuel tank neck,
   a housing member depending from underneath said cap body and provided with movable means for selectively engaging the underside of an inner lip of the fuel tank neck when said cap body is positioned on said fuel tank neck,
   an actuating member for operating said movable means for moving the same between first and second positions into and out of engagement with said inner lip of the fuel tank neck,
   a manually operable control element on the outer side of said cap body for causing said actuating member to operate said movable means between said first and second positions,
   and a pressure relief valve associated with said actuating member for venting the interior of said fuel tank to the atmosphere under predetermined pressure conditions.

5. A fuel tank cap comprising:
   a cap body provided on the underside with a gasket adapted to rest on the upper end of a fuel tank neck,
   a ball cage centrally depending from said fuel tank cap body, said ball cage having a plurality of tank neck engaging balls located therewithin and a plurality of side openings smaller in diameter than said balls through which said balls partially protrude to engage the lip of said tank neck and lock said cap in place,
   a plunger cone within said ball cage and slidable with respect thereto in a direction axial of said cap body wherein the conical periphery of said plunger cone is disposed in supporting engagement with respect to the inner side of said neck engaging balls, said plunger cone having a first axial position wherein the periphery thereof in contact with said neck engaging balls has a first diameter for holding said balls through said openings in locking relation against said lip of said tank neck, said cone having a second axial position wherein the periphery thereof in contact with said neck engaging balls has a second and smaller diameter so that said balls are movable inwardly of said cage to pass the lip of said neck for unlocking said cap,
   and a control handle accessible from the exterior of said fuel tank cap for moving said plunger cone axially of said cap body between said first and second axial positions.

6. The cap according to claim 5 wherein said plunger cone is provided with a spring for biasing said cone toward said first axial position, and said handle is rotatable upwardly with respect to said cap body, said handle having tab means adjacent said plunger cone which rotate downwardly when said handle is rotated upwardly for moving said plunger cone to said second axial position against the bias of said spring.

7. The cap according to claim 5 further including a pressure relief valve comprising a valve stem extending in a direction axial to said cap body and said ball cage, the upper end of said stem carrying a conical head seating downwardly toward a mating seat on the upper side of said plunger cone, and biasing means normally urging said stem downwardly to close said relief valve.

8. The fuel tank cap according to claim 5 in combination with a said fuel tank neck, said fuel tank neck having an inturned lip forming a pocket at the top of the fuel tank neck.

* * * * *

UNITED STATES PATENT AND TRADEMARK OFFICE
CERTIFICATE OF CORRECTION

PATENT NO. : 4,294,376
DATED : October 13, 1981
INVENTOR(S) : RUSSELL D. KELLER

It is certified that error appears in the above—identified patent and that said Letters Patent is hereby corrected as shown below:

Column 3, line 21, "te" should have been --the--.

Column 3, line 28, "fail" should have been --fall--.

Signed and Sealed this

Nineteenth Day of July 1983

[SEAL]

Attest:

GERALD J. MOSSINGHOFF

*Attesting Officer*   *Commissioner of Patents and Trademarks*